United States Patent
Yamamoto

(10) Patent No.: US 11,209,405 B2
(45) Date of Patent: Dec. 28, 2021

(54) LIQUID CHROMATOGRAPH ANALYSIS SYSTEM

(71) Applicant: Shimadzu Corporation, Kyoto (JP)

(72) Inventor: Kohei Yamamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 107 days.

(21) Appl. No.: 16/767,520

(22) PCT Filed: Dec. 1, 2017

(86) PCT No.: PCT/JP2017/043318
§ 371 (c)(1),
(2) Date: May 27, 2020

(87) PCT Pub. No.: WO2019/106833
PCT Pub. Date: Jun. 6, 2019

(65) Prior Publication Data
US 2020/0319148 A1 Oct. 8, 2020

(51) Int. Cl.
*G01N 30/86* (2006.01)
*G01N 30/72* (2006.01)
(Continued)

(52) U.S. Cl.
CPC ......... *G01N 30/7233* (2013.01); *G01N 30/06* (2013.01); *G01N 30/8658* (2013.01); *G01N 2030/027* (2013.01)

(58) Field of Classification Search
CPC ............... G01N 30/7233; G01N 30/06; G01N 30/8658; G01N 2030/027; G01N 30/34; G01N 30/72; G01N 35/00
See application file for complete search history.

(56) References Cited

U.S. PATENT DOCUMENTS 4,021,124 A * 5/1977 Sarstedt ................. G01N 21/03
356/246
4,310,249 A * 1/1982 Kramer ................. G01N 21/255
250/228
(Continued)

FOREIGN PATENT DOCUMENTS

CN 104395748 A * 3/2015 ........... G01N 27/447
EP 3309816 A1 * 4/2018 .......... H01J 49/0072
(Continued)

OTHER PUBLICATIONS

Written Opinion for PCT application PCT/JP2017/043318 dated Feb. 20, 2018, submitted with a machine translation.
(Continued)

*Primary Examiner* — David J Bolduc
(74) *Attorney, Agent, or Firm* — Muir Patent Law, PLLC

(57) ABSTRACT

Before repeating the processing that an LC/MS analysis is performed after diluting a large number of pretreated media samples (S16 to S19), an LC-MS stabilization processing (S11) of supplying a mobile phase to the LC-MS and performing an analysis without a sample according to the same gradient profile as that in a culture medium sample analysis and a standard sample analysis (S13) of supplying a standard sample to the LC-MS and obtaining data for generating a calibration curve are performed. Before the LC-MS stabilization processing and before the standard sample analysis, respectively, a standby time corresponding to a required time of a sample dilution is provided (Steps S10 and S12). With this, the time of the cycle including the LC-MS stabilization processing and the time of the cycle including the standard sample analysis are made to be the same as the time of the cycle of a dilution and an analysis to a culture medium sample. As a result, the stoppage time of the mobile phase before the mobile phase is fed according to the gradient profile becomes the same in every cycle, and
(Continued)

the staying time of the mobile phase in the degassing device becomes uniform, so that it is possible to avoid changes in the compositions of the mobile phases in the column and to achieve higher quantitativity.

10 Claims, 3 Drawing Sheets

(51) Int. Cl.
  *G01N 30/06* (2006.01)
  *G01N 30/02* (2006.01)

(56) References Cited

U.S. PATENT DOCUMENTS

| | | | | |
|---|---|---|---|---|
| 6,056,925 | A * | 5/2000 | Sarstedt | B01L 3/5021 |
| | | | | 422/548 |
| 8,364,409 | B2 * | 1/2013 | Rieder | C12Q 1/02 |
| | | | | 702/19 |
| 10,391,497 | B1 * | 8/2019 | Gong | G01N 21/27 |
| 11,156,624 | B2 * | 10/2021 | Fukaya | G06F 16/245 |
| 2017/0052171 | A1 | 2/2017 | Suzuki et al. | |
| 2018/0224406 | A1 * | 8/2018 | Xuan | H01J 49/425 |
| 2018/0298420 | A1 * | 10/2018 | Sanquer | C12Y 603/04002 |
| 2019/0119650 | A1 | 4/2019 | Suzuki et al. | |
| 2020/0041463 | A1 * | 2/2020 | Gilar | G01N 1/38 |

FOREIGN PATENT DOCUMENTS

| | | |
|---|---|---|
| JP | 2017-170079 A | 9/2017 |
| WO | 2015/166845 A1 | 11/2015 |
| WO | 2017/068727 A1 | 4/2017 |
| WO | 2017/068801 A1 | 4/2017 |
| WO | 2018/142600 A1 | 8/2018 |

OTHER PUBLICATIONS

LC/MS/MS Method Package Cell Culture Profiling, [online], [Searched on Nov. 21, 2017, downloaded on Feb. 7, 2020], Shimadzu Corporation, Internet <URL:http://www.an.shimadzu.co.jp/lcms/tq-option/mp_profiling_cell-culture.htm> submitted with a machine translation.

SCLAM-2000 Fully Automated LCMS pretreatment device, [online], [Searched on Nov. 21, 2017], Shimadzu Corporation, Internet <URL:http://www.an.shimadzu.co.jp/lcms/sclam2000-2.htm> submitted with a partial translation.

* cited by examiner

LIQUID CHROMATOGRAPH ANALYSIS SYSTEM

TECHNICAL FIELD

The present invention relates to a liquid chromatograph analysis system for performing a liquid chromatograph analysis after performing a pretreatment, such as, e.g., removing and diluting a predetermined component, to a sample. Here, the liquid chromatograph analysis system includes a liquid chromatograph mass spectrometry system using a mass spectrometer as a detector.

BACKGROUND OF THE INVENTION

In the field of regenerative medicine, researches and technological developments using multifunctional stem cells, such as, e.g., iPS cells and ES cells, have been actively carried out in recent years. In such researches and technological developments, it is necessary to culture large quantities of undifferentiated cells in a state in which the multifunctionality is maintained. Therefore, it is necessary to select an appropriate cultural environment and stably control the environment, and it is also necessary to confirm the state of cells in culture at high frequency.

For example, when a cell within a cell colony deviates from an undifferentiated state, all cells within the cell colony will eventually transition to undifferentiated deviant states because all cells within the cell colony are capable of differentiating. Therefore, an operator needs to check daily whether or not cells that deviated from the differentiation state (cells that have already differentiated or are likely to differentiate) are generated in the culturing cells, in other words, the differentiation state of the cells.

Conventionally, as a method for evaluating the differentiation state of cells, a method using immunostaining and a method for quantifying the expression levels of marker genes have been widely used. However, all of these methods require an invasive treatment of cells. For this reason, it was not possible to use the cells subjected to the evaluation after the evaluation of differentiation state for another purpose, for example, as a cell source for regenerative medicine. It was also impossible to evaluate changes over time for completely identical samples.

In contrast, Patent Documents 1 to 3 disclose a method for analyzing the abundance of a particular compound in the culture supernatant of a culture medium in which cells are cultivated rather than cells themselves using a liquid chromatograph mass spectrometer (LC-MS) and evaluating the differentiation state of the cells based on the results. In order to carry out such a method, software for an LC-MS for performing a multicomponent simultaneous analysis on a sample derived from a culture medium for culturing has also been put into practical use (see Non-Patent Document 1). Such methods have a significant benefit that the differentiation state of cells can be evaluated non-invasively to cells.

In evaluating the differentiation status of a cell based on the analysis result of a particular compound in a culture supernatant, after a sample cell is cultured in a culture medium, the sample (culture medium sample) derived from the culture medium used for the culture is introduced into an analysis device, such as, e.g., an LC-MS, from a culture device. However, the culture medium sample also includes protein, etc., that is a kind of contaminants in an LC/MS analysis and may change the quantity of metabolites by progressing metabolism in the culture medium sample over time. Therefore, a culture medium sample is usually introduced into an LC-MS after a pretreatment, such as, e.g., removing proteins in a pretreatment device, has been performed. That is, a culture medium sample is introduced into an LC-MS from a culture device via a pretreatment device. As a pretreatment device, a device capable of automatically and sequentially processing a large number of samples contained in sample containers, which is disclosed in, for example, Patent Document 4, Non-Patent Document 2, etc., is usable.

PRIOR ART DOCUMENT

Patent Document

Patent Document 1: Re-publication No. WO2015/166845
Patent Document 2: WO 2017/068727
Patent Document 3: WO 2017/068801
Patent Document 4: Japanese Unexamined Patent Application Publication No. 2017-170079

Non-Patent Document

Non-Patent Document 1: "LC/MS/MS Method Package Cell Culture Profiling", [online], [Searched on Nov. 21, 2017], Shimadzu Corporation, Internet
Non-Patent Document 2: "SCLAM-2000 Fully Automated LCMS pretreatment device", [online], [Searched on Nov. 21, 2017], Shimadzu Corporation, Internet

SUMMARY OF THE INVENTION

Problems to be Solved by the Invention

The progress of the metabolic action in a culture medium sample can be stopped by performing a pretreatment for removing proteins described above. Therefore, in cases where the waiting time until the pretreatment is likely to increase when the number of analysis target samples is large and the pretreatment and the analysis of the sample are sequentially performed one by one, it is desirable to perform batch processing in which a pretreatment is performed sequentially for all samples and then a pretreated sample analysis is performed sequentially. On the other hand, in cases where the number of analysis target samples is not many and there is less concern about the metabolic progression in a culture medium sample where the pretreatment has not been completed by the LC-MS analysis, it is more convenient to perform sequential processing in which a sample is sequentially subjected to a pretreatment and an analysis one by one. This is because, in such a sequential analysis, the pretreatment can be performed on the subsequent sample in a pretreatment device in parallel while a pretreated sample is being analyzed in an LC-MS. Therefore, it is possible to shorten the overall analysis time.

Regardless of batch processing or sequential processing, in cases where an LC/MS analysis is performed on a plurality of culture medium samples and a quantitative calculation is performed using the result, a an analysis of a standard sample for generating a calibration curve needs to be performed prior to the analysis of the culture medium sample. Further, various airborne suspended matters and undesired components may adhere to a sample flow path of an LC-MS which has not performed an analysis for a while. Therefore, stabilization processing is often performed prior to a standard sample analysis in order to make an LC-MS state in a steady state, such as, e.g., processing of flowing pure water through a sample flow path in an LC-MS (hereinafter referred to as "dripping") and processing of performing a background measurement while supplying a mobile phase at the same mobile phase condition (i.e., gradient profile) as in the normal analysis without injecting a culture medium sample (hereinafter referred to as "empty dripping").

That is, for example, in the case of sequentially performing a pretreatment and an LC/MS analysis on a plurality of culture medium samples, initially, stabilization processing of the LC-MS is performed, followed by an LC/MS analysis of a standard sample and then a pretreatment and an LC/MS analysis of a plurality of culture medium samples. As described above, since the state of the sample flow path in the LC-MS becomes almost the same steady-state as the state at the time of repeated analyses of culture medium samples by the stabilization processing, it is expected that the quantitativity of a compound contained in the culture medium sample is improved.

However, according to the experiments conducted by the present inventor, it has been found that in the case of a multicomponent simultaneous analysis in a culture medium sample in a cell culture as disclosed in Non-Patent Document 1, there is a compound in which, despite stabilization processing of an LC-MS, there is a large variation in the area values of the peaks in the extracted ion chromatogram, particularly in a compound included in the first culture medium sample, and therefore the quantitation accuracy is low.

The present invention has been made to solve the above-mentioned problems, and an object of the present invention is to provide an LC analysis system capable of improving quantification of a compound, particularly in an LC/MS analysis of a first sample, when an LC/MS analysis for a plurality of samples is repeatedly performed.

Means for Solving the Problem

The present invention made to solve the above-mentioned problems is directed to a liquid chromatograph analysis system provided with a pretreatment device that performs a predetermined pretreatment on a sample and an analysis device that performs a liquid chromatograph analysis after diluting the pretreated sample, and configured to perform the pretreatment and the liquid chromatograph analysis on a number of target samples and quantify a compound in the sample from a result of the analysis, the liquid chromatograph analysis system comprising:

a) a target sample analysis control unit configured to define a sequence of repeating an analysis cycle of a same length of time for a plurality of target samples so as to perform a pretreatment in the pretreatment device for a subsequent target sample during when a dilution of the sample and the liquid chromatograph analysis are being performed in the analysis device for one target sample, and control each part in accordance with the sequence;

b) a standard sample analysis control unit configured to control each part so that a standard sample is subjected to a liquid chromatograph analysis under the same mobile phase condition as a mobile phase condition for the target sample, at least in part in parallel with the pretreatment in the pretreatment device for a first target sample to be performed under the control of the target sample analysis control unit so that a length of time becomes the same length of time of the analysis cycle of a repeat analysis under the control of the target sample analysis control unit; and c) a stabilization processing execution control unit configured to control each part to perform stabilization processing for making a sample flow path in the analysis device in a steady-state prior to an analysis under the control of the standard sample analysis control unit such that a length of time becomes the same length of time of the analysis cycle of the repeat analysis under the control of the target sample analysis control unit.

In the present invention, it may be configured such that the stabilization processing includes background measurement processing that performs an LC without introducing a sample under the same mobile phase condition as a mobile phase condition for the target sample. Further, a step for removing unnecessary components adhered to a flow path inner wall by flushing water in the sample flow path of a column, etc., prior to the background measurement processing.

In the present invention, immediately before at least part of the LC analysis and the pretreatment is repeatedly performed in parallel under the control of the target sample analysis control unit, at least part of the LC analysis and the pretreatment for the first target sample is performed in parallel under the control of the standard sample analysis control unit. Further, immediately before that, stabilization processing is performed under the control of the stabilization processing execution control unit. The target sample is analyzed after the dilution in the analysis device, while the standard sample is immediately analyzed without being diluted in the analysis device. When performing the stabilization processing, for example, the background measurement processing is performed as described above. However, at that time, the sample injection itself is not performed, and needless to say, the sample dilution is not performed. Therefore, if the operation of each processing is immediately performed in the cycle of the standard sample analysis or the cycle of the stabilization processing, the length of time of these cycles becomes shorter than the cycle of the repeat analysis of the target sample.

Generally, in an LC, a degassing device is used to remove air bubbles contained in a mobile phase, but while dilution of a sample is being carried out in an analysis device, the feeding of the mobile phase is temporarily stopped to suppress unnecessary consumption of the mobile phase, and a part of the mobile phase stays in the degassing device. For this reason, in the case of the cycle in which dilution of a sample is not carried out and the time is shortened accordingly, the time in which the mobile phase stays in the degassing device is shortened, and the composition of the mobile phase may differ from the composition in the case of a repeat analysis. The present inventor experimentally confirmed this phenomenon, and found that the variation in the quantitative value of a part of compounds in the first sample is caused by this phenomenon. Therefore, in order to avoid this phenomenon, in the present invention, a predetermined standby time is added to the cycle of the standard sample analysis or the cycle of the stabilization processing, for example, so that the length of times of all the cycles are made uniform, and the staying time of the mobile phase in the degassing device is made substantially the same. As a result, variations in the compositions of the mobile phase for each cycle can be suppressed, and variations in the quantitative value of the compound can be reduced when the actual mobile phase conditions are met.

Generally, the time required for a diluting operation for diluting a sample differs depending on a dilution rate. Usually, the dilution rates of a plurality of samples that are the targets of repeat analyses are the same, but the dilution rates between target sample groups that are the targets of different repeat analyses are not necessarily the same.

Therefore, in the present invention, it is preferably configured such that the standard sample analysis control unit and the stabilization processing execution control unit each adjust the time of a cycle by waiting for a predetermined time and each change the predetermined time according to a dilution rate for diluting the sample in the analysis device.

With this configuration, regardless of the length of the required time of the diluting operation, it is possible to improve the quantitativity of the compound in the sample by aligning the length of time of the respective cycles. Further, since the length of time of the cycle does not need to be adjusted to the state in which the required time of the dilution operation is the longest, in cases where it is sufficient that the required time of the dilution operation is short, the analysis can be efficiently performed by shortening the cycle period.

In the LC analysis system according to the present invention, the mobile phase condition may be a gradient profile that changes the mixing ratio of a plurality of types of moving phases over time. Also in the case of the gradient elution, the composition of the mixed mobile phase can be equalized for each cycle by equalizing the staying time of the mobile phase in the degassing device.

Further, in the LC analysis system according to the present invention, it may be configured to further include:

a storage unit configured to store information indicating an execution time of an analysis cycle in a series of repeat analyses on a plurality of target samples for each target sample group; and a condition designation unit configured to designate the target sample group of an analysis target by a user, wherein the target sample analysis control unit acquires information on an execution time according to a designation by the condition designation unit from the storage unit to determine a sequence of a repeat analysis, and wherein the standard sample analysis control unit and the stabilization processing execution control unit adjust a length of time of each cycle according to information on an execution time acquired from the storage unit.

According to this configuration, regardless of the required time of an LC/MS analysis, the required times of the respective cycles can be easily equalized.

In the present invention, the detector of the liquid chromatograph may be, for example, a photodiode array (PDA) detector, but it is preferable that the detector of the liquid chromatograph is a mass spectrometer. The mass spectrometer used herein may be any mass spectrometer that can be connected to a liquid chromatograph.

Effects of the Invention

In particular, it is possible to improve the quantitativity of a compound in the first sample when repeatedly performing the LC analysis on a plurality of the samples. Further, since the LC analysis for one sample and the pretreatment for the subsequent sample are performed in parallel, the required time of the overall analysis for a plurality of samples can be shortened to realize higher throughputs.

EMBODIMENTS FOR CARRYING OUT THE INVENTION

Hereinafter, with reference to the attached drawings, a culture medium sample automatic analysis system which is an example of a biological sample automatic analysis system according to the present invention will be described in detail.

Figure 1:
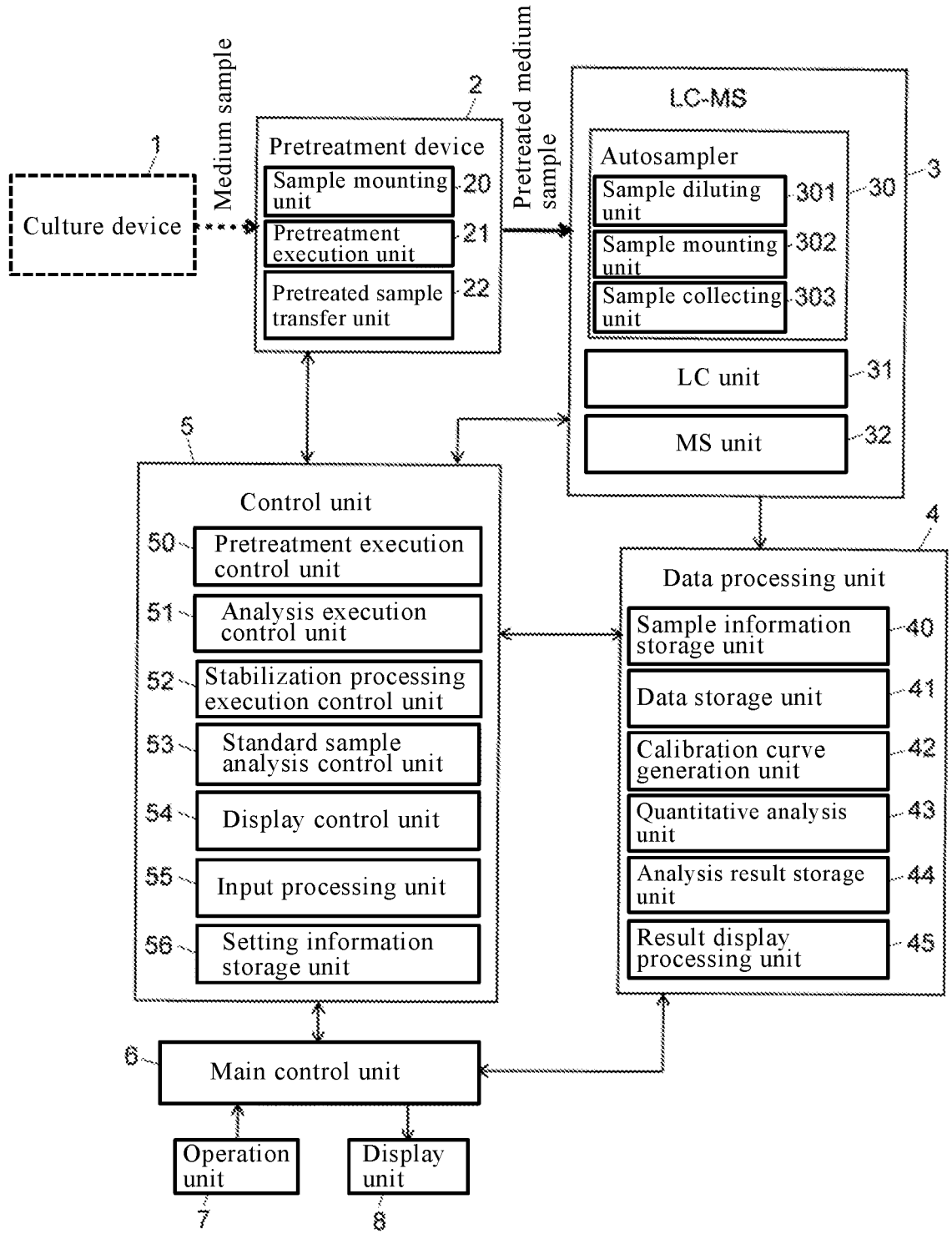
FIG. 1 is a schematic block configuration diagram of a culture medium sample automatic analysis system according to an example of the present invention.

FIG. 1 is a schematic block configuration diagram of a culture medium sample automatic analysis system of this example. The system of this example is a cultured cell evaluation system that is used to evaluate the differentiation state of a sample cell based on the abundance of a biomarker (cellular metabolite) in a culture supernatant of a culture medium in which a sample cell, such as a pluripotent cell, is cultured. Here, the culture supernatant of the culture medium is the culture medium sample.

The system of this example is provided with a pretreatment device 2, a liquid chromatograph mass spectrometer (LC-MS) 3, a data processing unit 4, a control unit 5, a main control unit 6, an operation unit 7, a display unit 8, etc. The culture device 1 in the block shown by the dotted line in FIG. 1 is not included in this system and provides a culture medium sample to be analyzed by this system.

Generally speaking, in this system, a number of culture medium samples obtained in the culture device 1 are provided to the pretreatment device 2, and in the pretreatment device 2, a predetermined pretreatment is sequentially performed for the culture medium samples. Each culture medium sample (pretreated sample) pretreated by the pretreatment device 2 is sent to the LC-MS 3, and the components in each culture medium sample are sequentially analyzed in the LC-MS 3. The data obtained by the analysis is sent to the data processing unit 4, and the data processing unit 4 performs predetermined data processing and outputs the result to the display unit 8 via the main control unit 6 for presentation to a user (operator). The control unit 5 controls the pretreatment device 2, the LC-MS 3, and the data processing unit 4 for the aforementioned processing. The main control unit 6 has a function of a user interface mainly through the operation unit 7 and the display unit 8.

The configuration of each part will be described in detail.

The culture device 1 is a device for culturing a sample cell. Here, the sample cell is, for example, a stem cell, typically a pluripotent cell, such as, e.g., an ES cell and an iPS cell. A cell differentiated from a stem cell can also be used as a sample cell. As a culture medium used for culturing such a sample cell, various culture mediums commonly used for culturing a stem cell, such as, e.g., DMEM/F12, or a culture medium (mTeSR1) containing DMEM/F12 as the main component, can be used. When culturing a cell on such a culture medium, various types of metabolites by the cell are mixed in the culture supernatant. An operator prepares a culture medium sample by manually collecting a part of the culture supernatant and injecting it into a predetermined vial (sample container). Of course, a part of the culture supernatant may be automatically collected at a fixed time every day, i.e., a culture medium sample may be automatically prepared.

The pretreatment device 2 is provided with a sample mounting unit 20 including a sample rack on which a plurality of vials is mounted, a pretreatment execution unit 21 that perform the pretreatment for removing unwanted components, such as, e.g., proteins, through processes of sample dispensing, reagent dispensing, agitating, filtering, etc., with respect to the culture medium sample in one vial selected from a plurality of vials mounted on the sample mounting unit 20, and a sample transfer unit 22 that transfers a container in which a pretreated culture medium sample is temporarily stored to a predetermined position of the LC-MS 3.

In this example, the pretreatment of removing proteins can specifically be performed by adding isopropyl malic acid as an inner standard sample to a culture medium sample as a reagent and treating with an extracting solution in which, for example, methanol, chloroform, and water are mixed at a ratio of 2.5:1:1. Note that the pretreatment is not limited to a removal of proteins, and another pretreatment may be performed on a culture medium sample. As the pretreatment device 2, for example, a device disclosed in, for example, Patent Document 4, Patent Document 2, etc., can be used, but the present invention is not limited thereto.

The LC-MS 3 includes, although not illustrated, a liquid chromatograph (LC) unit 31 that includes a degassing device, a liquid feed pump, a mixer, an injector, a column, etc., an autosampler 30 that selects one of a large number of culture medium samples and introduces it into the LC unit 31, and a mass spectrometry (MS) unit 32 that performs mass spectrometry on the components in the sample separated in the temporal direction at the column of the LC unit 31. The autosampler 30 includes a sample mounting unit 302 including a sample rack on which a number of vials different from those used in the pretreatment device 2 are mounted, a sample diluting unit 301 for aspirating a pretreated culture medium sample in a container transferred to a predetermined position by the pretreated sample transfer unit 22 of the pretreatment device 2, adding ultrapure water to dilute the culture medium sample at a predetermined ratio, and then dispensing the culture medium sample into a vial mounted on the sample mounting unit 302, and a sample collecting unit 303 that collects a predetermined amount of the pretreated and diluted culture medium sample from one vial among a number of vials mounted on the sample mounting unit 302 and introduces the sample into an injector of the LC unit 31.

In this example, the LC unit 31 performs gradient elution that changes the mixing ratio of two types of mobile phases over time in order to well separate a large number of compounds included in the culture medium sample.

In order to evaluate the differentiation status of the sample cell, at the MS unit 32, mass spectrometry is performed on at least one compound selected from the group consisting of, for example, putrescine, quinurenin, cystathionine, ascorbic acid, riboflavin, pyruvic acid, serine, cysteine, threonic acid, citric acid, and orotic acid as biomarkers. The method of the mass spectrometer used as the MS unit 32 is not particularly limited as long as it includes an atmospheric pressure ion source, and for example, a quadrupole mass spectrometer, a tandem quadrupole mass spectrometer, a quadrupole-time-of-flight mass spectrometer, etc., can be used.

The data processing unit 4 includes functional blocks, such as, e.g., a sample information storage unit 40, a data storage unit 41, a calibration curve generation unit 42, a quantitative analysis unit 43, an analysis result storage unit 44, and a result display processing unit 45. Sample information storage unit 40 stores sample information to be inputted and set for each vial in which the culture medium sample is accommodated in the pretreatment device 2. The data storage unit 41 stores the data collected by performing analyses in the LC-MS 3. The calibration curve generation unit 42 generates and stores a calibration curve for each compound based on the data obtained by analyzing a standard sample by the LC-MS 3. The quantitative analysis unit 43 prepares an extracted ion chromatogram for each data obtained by targeting a particular compound, and calculates the density value, etc., of a compound based on the area value and the height value of the peaks observed in the chromatogram by using the calibration curve prepared in advance. The analysis result storage unit 44 stores the calculation result by the quantitative analysis unit 43, etc. The result display processing unit 45 prepares a graph based on the calculated analysis result, etc., prepares a screen of a predetermined format in which the graph is arranged, and outputs the screen to the display unit 8 via the main control unit 6.

The control unit 5 includes functional blocks, such as, e.g., a pretreatment execution control unit 50, an analysis execution control unit 51, a stabilization processing execution control unit 52, a standard sample analysis control unit 53, a display control unit 54, an input processing unit 55, and a setting information storage unit 56.

The pretreatment execution control unit 50 controls the pretreatment operation to the culture medium sample in the pretreatment device 2, and also controls the transfer of the container containing the pretreated sample. The analysis execution control unit 51 controls the analysis operation for the culture medium sample in the LC-MS 3. In order to perform the gradient elution in the LC unit 31, the analysis execution control unit 51 controls a liquid feed pump and a mixer in accordance with the gradient profile prepared in advance. As will be described later, the stabilization processing execution control unit 52 performs the control for executing predetermined stabilization processing to make the LC unit 31 and MS unit 32 in a state capable of performing a steady-state analysis immediately before a substantial analysis. This stabilization processing includes, for example, at least one of processing (dripping) of flowing water through a flow path (typically, column) through which a culture medium sample flows in the LC unit 31 and the MS unit 32, and processing (empty dripping) of acquiring a background by performing the LC/MS analysis without injecting a culture medium sample into the LC unit 31. The standard sample analysis control unit 53 injects a standard sample instead of a culture medium sample into the LC unit 31, and performs the control for subjecting the standard sample to the LC/MS analysis. The standard sample contains a plurality of compounds to be quantified at a known concentration.

As will be described later, the display control unit 54 generates a screen for displaying the operating states of the pretreatment device 2 and the LC-MS 3 and a screen for setting information (sample information) of a culture medium sample supplied to the pretreatment device 2 or analytical conditions for the respective samples by the operator, and outputs the screen to the display unit 8 via the main control unit 6. The input processing unit 55 performs predetermined processing in response to the input operation of the operation unit 7 by the operator. In addition, the setting information storage unit 56 stores the sample information, the analysis condition, etc., of each culture medium sample, which are input and set by input operations, etc., by the operator.

Note that the entities of the data processing unit 4, the control unit 5, and the main control unit 6 are a personal computer (or more sophisticated workstation), and the functions of the above-mentioned blocks may be achieved by executing one or a plurality of dedicated software installed on the computer. In this configuration, the operation unit 7 is a keyboard or a pointing device such as a mouse attached to a personal computer, etc., and the display unit 8 is a display monitor.

Figure 2:
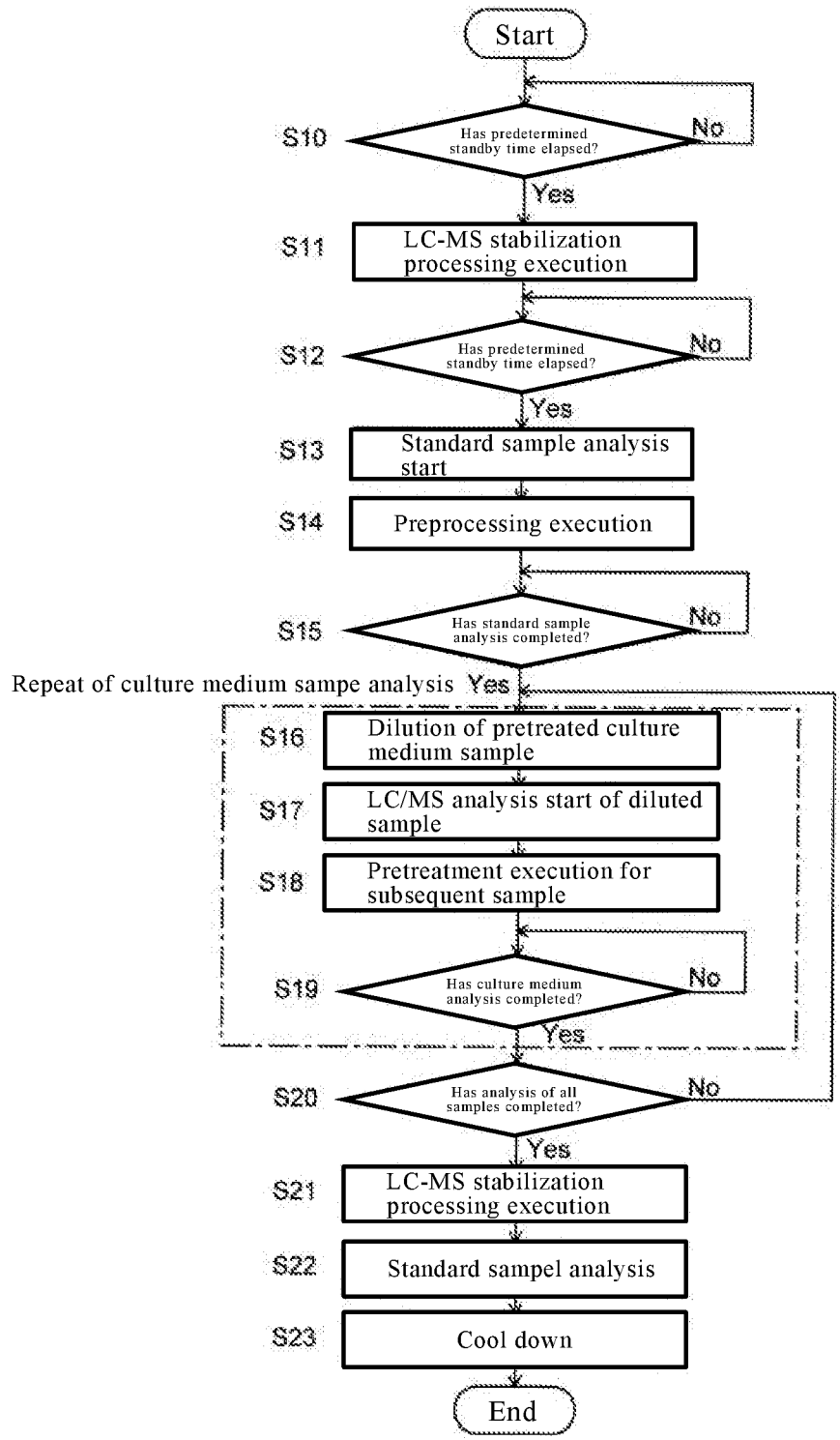
FIG. 2 is a flowchart showing the flow of the processing at the time of sequentially analyzing multiple samples in the culture medium sample automatic analysis system of the example.
Figure 3:
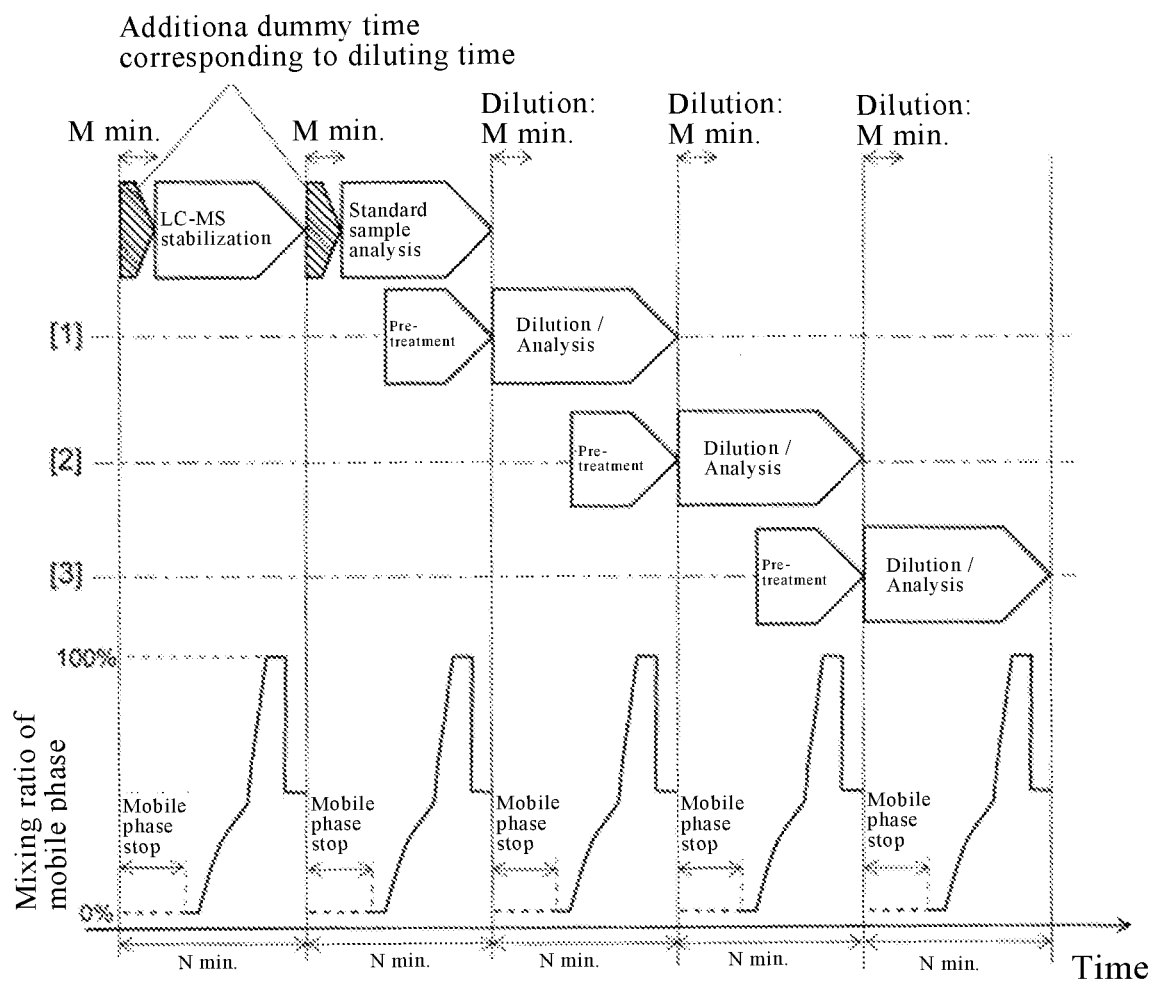
FIG. 3 is an explanatory diagram showing the operation states of the respective parts and changes in the components in the mobile phase at the time of sequentially analyzing multiple samples in the culture medium sample automatic analysis system of this example.

In the culture medium sample automatic analysis system of this example, as the analysis mode, it is possible to selectively perform any one of a batch mode in which a pretreated media sample is sequentially subjected to the LC/MS analysis after executing a pretreatment on all of a large number of culture medium samples prepared in advance and a sequential mode in which a process in which the LC/MS analysis is subsequently performed on the sample after executing a pretreatment on one culture medium sample is sequentially performed on a large number of culture medium samples. FIG. 2 is a flowchart showing a flow of a process when performing an analysis by a sequential mode in the culture medium sample automatic analysis system of this example. FIG. 3 is an explanatory diagram showing the operating state of each part and the change in the components in the mobile phase at the time of the analysis by the sequential mode.

With reference to FIG. 2 and FIG. 3, the procedures of the analysis by the sequential mode will be described. At the time of the sequential mode, a large number of culture medium samples need not be prepared in the sample mounting unit 20 prior to the analysis, and a culture medium sample may be prepared sequentially in accordance with the progress of the analysis. Of course, when there is no problem such as the progress of metabolism in a non-pretreated culture medium sample, that is, when there is no problem in the change of components in the sample even if a non-pretreated culture medium sample is left for a certain time, a large number of culture medium samples may be prepared in advance in the sample mounting unit 20.

When the sequential analysis is started, the stabilization processing execution control unit 52 performs stabilization processing in the LC unit 31 and the MS unit 32, and waits until a predetermined standby time elapses before the sequential analysis is started (Step S10). This standby time is an additional dummy time M corresponding to the diluting time shown in FIG. 3, and is determined in accordance with the dilution rate of the sample dilution performed by the sample diluting unit 301 of the autosampler 30.

That is, prior to the analysis, the operator inputs information (e.g., culture name) specifying the culture medium sample to be subjected to a repeat analysis from the operation unit 7, and inputs a dilution rate as one of the analysis conditions. In the setting information storage unit 56, a required time of the LC/MS analysis has been stored in advance in correspondence with the data specifying the culture medium sample. The required time of this LC/MS analysis can be obtained from the analytical condition such as a gradient profile. The required time of the LC/MS analysis and the input dilution rate are set to the stabilization processing execution control unit 52 and the standard sample analysis control unit 53 in addition to the analysis execution control unit 51. Then, the stabilization processing execution control unit 52 calculates the standby time based on the dilution rate and the required time of the LC/MS analysis, and controls each part to wait for the initiation of the stabilization processing by that time. When the predetermined standby time has elapsed, the stabilization processing execution control unit makes the LC unit 31 and the MS unit 32 perform the stabilization processing (Step S11). It is assumed that the standby time is three minutes as an example.

At the time of the stabilization processing, in the LC unit 31, the mobile phase is supplied to the column in accordance with the gradient profile in the same manner as at the time of the LC/MS analysis of the culture medium sample, which will be described later. The MS unit 32 acquires repeated mass spectrum data during this period. However, at this time, since a sample is not injected into the mobile phase from the injector, the background measurement without a sample is performed. The required time of the stabilization processing is the same as the required time of the LC/MS analysis to the culture medium sample, which will be described below, and is assumed to be 17 minutes here.

When the stabilization processing is completed, the standard sample analysis control unit 53 makes the LC unit 31 and the MS unit 32 perform the LC/MS analysis for the standard sample prepared in advance, but waits until the predetermined standby time has elapsed (Step S12). This standby time is the same length as the standby time in Step S10 and depends on the dilution rate of the culture medium sample and the required time of the LC/MS analysis. When a predetermined standby time has elapsed, the standard sample is injected into the mobile phase from the injector in the LC unit 31, and the LC/MS analysis is performed by the LC unit 31 and the MS unit 32 (Step S13). Also at this time, in the LC unit 31, the mobile phase is supplied to the column in accordance with the gradient profile, similarly to the LC/MS analysis of the culture medium sample.

The MS unit 32 acquires signal-strength-value data targeting different mass-to-charge ratios (or MRM-transitions) over time under the control of the standard sample analysis control unit 53. In other words, the signal strength value data corresponding to the compounds is acquired at the timing corresponding to the holding time of each compound included in a standard sample. The calibration curve generation unit 42 generates a calibration curve corresponding to each compound based on the acquired data. Specifically, an extracted ion chromatogram is generated for each compound based on the collected data, and the area value or the height value of the peaks corresponding to the compound are obtained. Then, a calibration curve is generated from the relationship between the known density and the peak area values or the peak height values.

Here, one point calibration curve is prepared from the analysis result for the standard sample containing the target compound at one type of concentration, but in the case of preparing a multi-point calibration curve, such as, for example, a three-point calibration curve and a five-point calibration curve, instead of a one-point calibration curve, an LC/MS analysis for a plurality of standard sample containing the target compound at different concentrations may be repeated.

At the time when a predetermined time has elapsed since the LC/MS analysis for a standard sample was initiated in Step S13, the pretreatment execution control unit 50 controls the pretreatment execution unit 21 and the pretreated sample transfer unit 22 in the pretreatment device 2 to perform a pretreatment for the first culture medium sample (Step S14). When the pretreatment for the first culture medium sample is completed in the pretreatment execution unit 21, the pretreated culture medium sample is transferred by the pretreated sample transfer unit 22 to a position where it can be sucked by the sample diluting unit 301 in the LC-MS 3. Since both the required time of the LC/MS analysis to a standard sample and the required time of the pretreatment to a culture medium sample are fixed, the timing of the pretreatment initiation is determined so that the pretreatment ends prior to the completion of the LC/MS analysis to a standard sample. The required time of the LC/MS analysis to a standard sample is the same as the required time of the LC/MS analysis to a culture medium sample described below, here 17 minutes.

When the completion of the LC/MS analysis for a standard sample is confirmed after completion of the pretreatment for the first culture medium sample (Yes in Step S15), the analysis execution control unit 51 controls the sample diluting unit 301 so that the dilution for the culture medium sample pretreated immediately before the confirmation is performed (Step S16). At this time, the sample is diluted at a dilution rate set as described above.

Here, the required time of dilution is the same as in the aforementioned standby time and is 3 minutes. When the dilution is completed, the diluted pretreated media sample is sucked by the sample collecting unit 303 and injected into the mobile phase from the injector of the LC unit 31 under the control of the analysis execution control unit 51, and the LC/MS analysis to the culture medium sample is initiated (Step S17). At this time, the mobile phase is supplied to the column in accordance with the gradient profile in the LC unit 31.

Similar to the LC/MS analysis of the standard sample, the MS unit 32 acquires signal-strength-value data targeting a mass-to-charge ratio (or MRM-transition) that differs over time. In other words, the signal strength value data corresponding to the compound is acquired at the timing corresponding to the holding time of each compound which is a quantification target in the culture medium sample. The data acquired at this time is temporarily stored in the data storage unit 41.

At the time when the predetermined time has elapsed since the LC/MS analysis for the culture medium sample has started in Step S17, the pretreatment execution control unit 50 controls the pretreatment execution unit 21 and the pretreated sample transfer unit 22 in the pretreatment device 2 to perform the pretreatment for the culture medium sample to be analyzed next (Step S18). This is substantially the same as the process of Step S14. When the pretreatment for the culture medium sample of the subsequent analysis target is completed in the pretreatment execution unit 21, the pretreated culture medium sample is transferred to a position where it can be sucked by the sample diluting unit 301 in the LC-MS3 by the pretreated sample transfer unit 22. Also in this case, the timing of the initiation of the pretreatment is determined so that the pretreatment for the subsequent sample is completed prior to the completion of the LC/MS analysis for the culture medium sample.

When the completion of the LC/MS analysis for the culture medium sample is confirmed after the completion of the pretreatment for the culture medium sample to be analyzed next (Step S19: Yes), the analysis execution control unit 51 determines whether or not the analysis has been completed for all culture medium samples to be analyzed (Step S20). When a culture medium sample to be analyzed still remains, the process returns from Step S20 to S16, and the processes of Step S16 to S19 are repeated. If it is determined Yes in Step S20, since there is no culture medium sample to be analyzed next, the process of Step S18 immediately before is omitted. As described above, the required time for the dilution of the culture medium sample is 3 minutes, and the required time of the LC/MS analysis to the culture medium sample is 17 minutes, so the required time of 1 cycle from Step S16 to S19 is 20 minutes. This cycle is repeated by the number of culture medium samples.

When the analyses for all culture medium samples have been completed, it is determined Yes in Step S20, and the stabilization processing execution control unit 52 performs stabilization processing in the LC unit 31 and the MS unit 32 in the same manner as in Step S11 (Step S21). After completion of stabilization processing, the standard sample analysis control unit 53 makes the LC unit 31 and the MS unit 32 perform the LC/MS analysis for the standard sample, similarly to Step S13 (Step S22).

In Step S22, when the data by the LC/MS analysis for the standard sample is obtained, in the data processing unit 4, the calibration curve generation unit 42 generates a calibration curve corresponding to each compound based on the obtained data. The mean of the calibration curve obtained prior to the execution of the repeat analysis for the plurality of culture medium samples and the calibration curve obtained after the execution of the repeat analysis is then calculated and stored as a calibration curve for use in quantitative analysis. After completion of the series of processing as described above, the analysis execution control unit 51 stops supplying the mobile phase and the gases in the LC unit 31 and the MS unit 32, and cool-down is executed (Step S23).

As described above, the data collected by the LC/MS analysis for a number of culture medium samples is stored in the data storage unit 41. In the calibration curve generation unit 42, the calibration curve based on the result of analyzing the standard sample is stored. So, the quantitative analysis unit 43 generates an extracted ion chromatogram for each compound by using the data for the culture medium sample, and calculates the area value or the height value of the peaks corresponding to the compound. Then, referring to the above calibration curve, the density is calculated from the peak area value or the peak height value. Since the peak area value and the density value for one or a plurality of compounds are obtained for each culture medium sample in this manner, the peak area value and the density are stored as one file in the analysis result storage unit 44.

As shown in FIG. 3, in this system, the pretreatment for the subsequent culture medium sample is performed in parallel in the pretreatment device 2 while the LC/MS analysis for one culture medium sample is performed in the LC-MS 3. Therefore, sequential analyses for a large number of culture medium samples can be efficiently performed. In addition, as described above, the time required for the dilution and the LC/MS analysis for one culture medium sample, that is, the time of one cycle of a repeat analysis of a culture medium sample is 20 minutes. However, the time of the first cycle at which stabilization processing is performed and the time of the cycle at which the subsequent standard sample is analyzed are also the same 20 minutes because a standby time (additional dummy time corresponding to the dilution time) is provided.

In each cycle, there is a change in the composition of the mobile phase according to the same gradient profile in the LC unit 31, for example, at the time performing the dilution, the mobile phase feeding is stopped. Since the mobile phase stays in the degassing device when the mobile phase feeding is stopped, differences in the staying times result in variations in the mobile phase components. In this system, in the first and second cycles, no dilution of the sample is performed. However, since the standby time is set as described above, the feeding of the mobile phase is stopped for the same amount of time. Therefore, the mobile phase delivery condition, specifically the duration time in which the mobile phase stays in the degassing device at the first and second cycle becomes exactly the same as the analysis cycle for the culture medium sample. The composition of the mobile phase in the column, in particular in the LC/MS analysis for the first culture medium sample, can thereby be made approximately the same as the composition of the mobile phase in the column in the LC/MS analysis for the second and subsequent culture medium samples. This ensures high-quality quantitation of compounds in each culture medium sample. It should be noted that although the duration required for dilution changes when a dilution rate differs, the length of the time of cycle can be adjusted by changing the standby time according to a dilution rate.

It should be noted that the above examples are examples of the present invention, and it is needless to say that even if the scope of the present invention is arbitrarily changed, modified, or added, they are covered by claims.

For example, a treatment on a sample other than a "sample dilution" (e.g., a type of pretreatment) may be performed by the autosampler 30 of the LC-MS 3. In the flowchart shown in FIG. 2, the process of Step S21 is not essential.

In the systems of the above-described example, each compound separated by the LC unit 31 is detected by the MS unit 32, but other detectors other than a mass spectrometer may be used. However, since it is generally the case that the detector is highly sensitive that the above-mentioned variations in the compositions of the mobile phase in the column appear in the analysis result, the present invention is particularly useful when a highly sensitive detector is used, i.e., when the mass spectrometer is used as the detector, the present invention is particularly useful.

DESCRIPTION OF SYMBOLS

1 . . . Culture device
2 . . . Pretreatment device
20 . . . Sample mounting unit
21 . . . Pretreatment execution unit
22 . . . Sample transfer unit
3 . . . LC-MS
30 . . . Autosampler
301 . . . Sample diluting unit
302 . . . Sample mounting unit
303 . . . Sample collecting unit
31 . . . LC unit
32 . . . MS unit
4 . . . Data processing unit
40 . . . Sample information storage unit
41 . . . Data storage unit
42 . . . Calibration curve generation unit
43 . . . Quantitative analysis unit
44 . . . Analysis result storage unit
45 . . . Result display processing unit
5 . . . Control unit
50 . . . Pretreatment execution control unit
51 . . . Analysis execution control unit
52 . . . Stabilizing processing execution control unit
53 . . . Standard sample analysis control unit
54 . . . Display control unit
55 . . . Input processing unit
56 . . . Setting information storage unit
6 . . . Main control unit
7 . . . Operation unit
8 . . . Display unit

The invention claimed is:

1. A liquid chromatograph analysis system provided with a pretreatment device that performs a predetermined pretreatment on a sample and an analysis device that performs a liquid chromatograph analysis after diluting the pretreated sample, and configured to perform the pretreatment and the liquid chromatograph analysis on a number of target samples and quantify a compound in the sample from a result of the analysis, the liquid chromatograph analysis system comprising:
a) a target sample analysis control unit configured to define a sequence of repeating an analysis cycle of a same length of time for a plurality of target samples so as to perform a pretreatment in the pretreatment device for a subsequent target sample during when a dilution of the sample and the liquid chromatograph analysis are being performed in the analysis device for one target sample, and control each part in accordance with the sequence;
b) a standard sample analysis control unit configured to control each part so that a standard sample is subjected to the liquid chromatograph analysis under the same mobile phase condition as a mobile phase condition for the target sample, at least in part in parallel with the pretreatment in the pretreatment device for a first target sample to be performed under the control of the target sample analysis control unit so that a length of time becomes the same length of time of the analysis cycle of a repeat analysis under the control of the target sample analysis control unit; and
c) a stabilization processing execution control unit configured to control each part to perform stabilization processing for making a sample flow path in the analysis device in a steady-state prior to an analysis under the control of the standard sample analysis control unit such that a length of time becomes the same length of time of the analysis cycle of the repeat analysis under the control of the target sample analysis control unit.

2. The liquid chromatograph analysis system as recited in claim 1,
wherein the stabilization processing includes background measurement processing that performs the liquid chromatograph analysis without introducing a sample under the same mobile phase condition as a mobile phase condition for the target sample.

3. The liquid chromatograph analysis system as recited in claim 1,
wherein the standard sample analysis control unit and the stabilization processing execution control unit each adjust time of a cycle by waiting for a predetermined time, and each change the predetermined time according to a dilution rate for diluting the sample in the analysis device.

4. The liquid chromatograph analysis system as recited in claim 1,
wherein the mobile phase condition is a gradient profile.

5. The liquid chromatograph analysis system as recited in claim 1, further comprising:
a storage unit configured to store information indicating an execution time of an analysis cycle in a series of repeat analyses on a plurality of target samples for each target sample group; and
a condition designation unit configured to designate a target sample group of an analysis target by a user,
wherein the target sample analysis control unit acquires information on an execution time according to a designation by the condition designation unit from the storage unit to determine a sequence of a repeat analysis, and
wherein the standard sample analysis control unit and the stabilization processing execution control unit adjust a length of time of each cycle according to information on an execution time acquired from the storage unit.

6. The liquid chromatograph analysis system as recited in claim 1,
wherein the analysis device performs a liquid chromatograph mass spectrometry after diluting the pretreated sample and a quantitative analysis for each compound contained in the target sample based on data collected by the analysis device.

7. The liquid chromatograph analysis system as recited in claim 2,
wherein the analysis device performs a liquid chromatograph mass spectrometry after diluting the pretreated sample and a quantitative analysis for each compound contained in the target sample based on data collected by the analysis device.

8. The liquid chromatograph analysis system as recited in claim 3,
wherein the analysis device performs a liquid chromatograph mass spectrometry after diluting the pretreated sample and a quantitative analysis for each compound contained in the target sample based on data collected by the analysis device.

9. The liquid chromatograph analysis system as recited in claim 4,
wherein the analysis device performs a liquid chromatograph mass spectrometry after diluting the pretreated sample and a quantitative analysis for each compound contained in the target sample based on data collected by the analysis device.

10. The liquid chromatograph analysis system as recited in claim 5,
wherein the analysis device performs a liquid chromatograph mass spectrometry after diluting the pretreated sample and a quantitative analysis for each compound contained in the target sample based on data collected by the analysis device.

* * * * *